(12) United States Patent
Zustak et al.

(10) Patent No.: US 8,773,331 B2
(45) Date of Patent: Jul. 8, 2014

(54) SIMULTANEOUS VIEWING OF MULTIPLE VIEWER-SPECIFIC PROGRAMMING ON A SINGLE DISPLAY

(75) Inventors: Frederick J. Zustak, Poway, CA (US); Brant L. Candelore, San Diego, CA (US)

(73) Assignee: Sony Corporation, Tokyo (JP)

( * ) Notice: Subject to any disclaimer, the term of this patent is extended or adjusted under 35 U.S.C. 154(b) by 461 days.

(21) Appl. No.: 12/972,701

(22) Filed: Dec. 20, 2010

(65) Prior Publication Data
US 2012/0154553 A1 Jun. 21, 2012

(51) Int. Cl.
*H04N 13/04* (2006.01)
*G02B 27/22* (2006.01)

(52) U.S. Cl.
CPC ....... *H04N 13/0452* (2013.01); *H04N 13/0497* (2013.01); *G02B 27/2264* (2013.01)
USPC .......................................................... 345/51

(58) Field of Classification Search
CPC .................................................. G02B 27/2264
USPC .......................................................... 348/51
See application file for complete search history.

(56) References Cited

U.S. PATENT DOCUMENTS

| 6,057,811 | A | 5/2000 | Edwards | |
|---|---|---|---|---|
| 6,188,442 | B1 * | 2/2001 | Narayanaswami | 348/564 |
| 7,373,650 | B1 * | 5/2008 | Rodriguez et al. | 725/41 |
| 7,426,467 | B2 * | 9/2008 | Nashida et al. | 704/275 |
| 2003/0093792 | A1 * | 5/2003 | Labeeb et al. | 725/46 |
| 2003/0097657 | A1 * | 5/2003 | Zhou et al. | 725/46 |
| 2004/0109093 | A1 * | 6/2004 | Small-Stryker | 348/739 |
| 2004/0210932 | A1 * | 10/2004 | Mori et al. | 725/39 |
| 2005/0120369 | A1 * | 6/2005 | Matz | 725/40 |
| 2008/0260280 | A1 * | 10/2008 | Wu et al. | 382/254 |
| 2010/0177172 | A1 | 7/2010 | Ko et al. | |
| 2010/0177174 | A1 * | 7/2010 | Ko et al. | 348/56 |

FOREIGN PATENT DOCUMENTS

CN 101867839 A 10/2010

OTHER PUBLICATIONS

Liu Jiang, Chinese Office Action for corresponding Chinese application, dated Dec. 30, 2013.

* cited by examiner

*Primary Examiner* — Sath V Perungavoor
*Assistant Examiner* — Peter D Le
(74) *Attorney, Agent, or Firm* — Miller Patent Services; Jerry A. Miller

(57) ABSTRACT

In certain implementations, a method consistent with certain embodiments involves associating a first headset with a first viewer profile; associating the first headset with a first audio channel within an audio channel multiplex and with a first set of display refresh time slots; selecting a first advertisement based on criteria contained in the first viewer profile; displaying a video portion of the first advertisement on a video display during the first set of refresh time slots associated with the first headset; transmitting a synchronization signal that is synchronized to a video frame refresh clock to establish the video time slots; and transmitting an audio portion of the first advertisement on the first audio channel associated with the headset. This abstract is not to be considered limiting, since other embodiments may deviate from the features described in this abstract.

39 Claims, 7 Drawing Sheets

US 8,773,331 B2

SIMULTANEOUS VIEWING OF MULTIPLE VIEWER-SPECIFIC PROGRAMMING ON A SINGLE DISPLAY

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Modern 3D (three dimensional, i.e., stereoscopic) televisions are, at this writing, emerging on the television (TV) market. In most cases, these devices utilize display panels that are refreshed at a high rate of speed—generally 240 Hz or more, with speed being expected to increase further with newer generations of television sets. In most implementations, left eye and right eye data are presented in alternating frames, sometimes with a blank or black frame separating the alternating frames to minimize crosstalk. Receipt of the left eye and right eye video frames are then alternated by use of synchronized shutter glasses which alternately open and close the left and right eye shutters in synchronization with the TV in order to create a three dimensional stereoscopic viewing experience.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
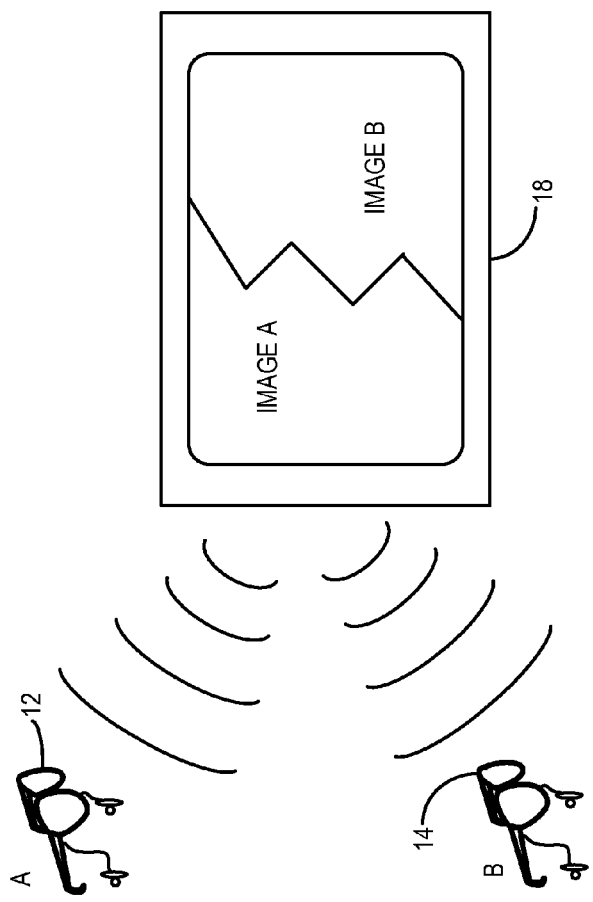
FIG. 1 is an exemplary generalized depiction of a 3D television display presenting differing images to two sets of shutter glasses in a manner consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "processor", "controller", "CPU", "Computer" and the like as used herein encompasses both hard programmed, special purpose, general purpose and programmable devices and may encompass a plurality of such devices or a single device in either a distributed or centralized configuration without limitation.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

The terms "advertisement", "ad", "commercial" and the like as used herein is intended to mean a television or other audio/video advertisement that can be rendered on a television display and which are commonly called "commercials" or "commercial spots". These terms are used in the general conversational sense to refer to TV advertisements.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accord with certain implementations consistent with embodiments of the present invention, a User Interface (UI) is used to associate a viewing headset with a particular viewer so that the viewer's profile including preferences and restrictions are implemented. This is accomplished in a manner such that multiple viewers can share the same display for different programming and different advertising in the same environment (e.g., a home living room). Multiplexing of audio is utilized so that an individualized audio stream can be beamed wirelessly as RF or IR transmission to different headsets. In another implementation, non-linear audio can be beamed to multiple viewers simultaneously. A multi-viewer TV set could thus have multiple beams of audio that matches the individualized video content. In addition, the system provides for targeted advertising. The same main content can be delivered to all glasses, except during a commercial. For example, a beer commercial might not be shown to a minor Instead, the minor might receive a toy commercial. Other implementation variations will be apparent to those skilled in the art upon consideration of the present teachings.

Turning now to FIG. 1, as noted previously 3D (three dimensional, i.e., stereoscopic) televisions are, at this writing, emerging on the television (TV) market. In most cases, these devices utilize progressively refreshed display panels that are refreshed at a high rate of speed—generally 240 Hz or more, with speed being expected to increase further with newer generations of television sets. In most implementations, left eye and right eye data are presented in alternating frames, sometimes with a blank or black frame separating the alternating frames to minimize crosstalk. Receipt of the left eye and right eye video frames are then alternated by use of synchronized shutter glasses which alternately open and close the left and right eye shutters in synchronization with the TV in order to create a three dimensional stereoscopic viewing experience. In other cases, polarized lenses are used to separate left eye and right eye images.

In accord with implementations consistent with embodiments of the present invention, two sets of shutter glasses headsets 12 and 14 can be utilized to enable a viewer to view and hear two sets of audio/video content simultaneously using a single display 18. The headset 12 (A) is depicted as viewing image A of display 18 while headset 14 (B) is depicted as viewing image B of display 18. The jagged line separating images A and B is intended to be symbolic of a single display alternately displaying images A and B using appropriately synchronized shutter glasses forming a part of the headsets 12 and 14.

Figure 2:
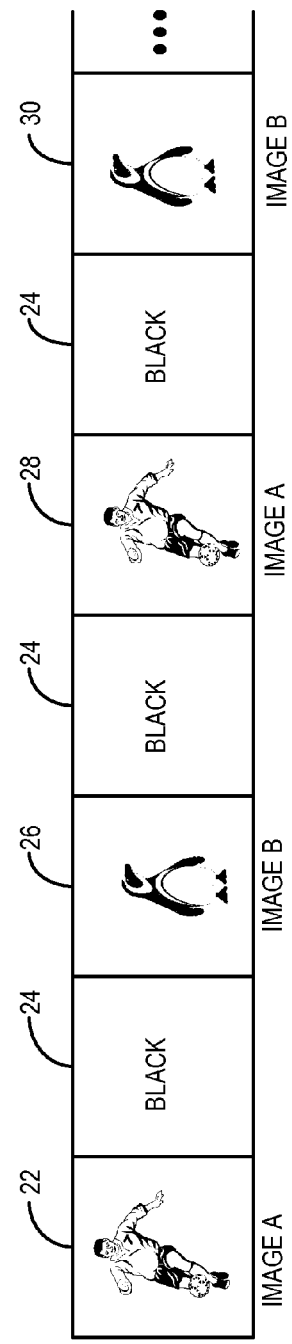
FIG. 2 is an example of a sequence of images presented to enable viewing of multiple images simultaneously by different viewers in a manner consistent with certain embodiments of the present invention.

Briefly, with reference to FIG. 2, this is accomplished by presenting an alternating set of images to the viewer. Depending on the refresh rate used and the number of viewers, this alternating set of viewers could view 2D or 3D content—limited only by the number of cycles of display refresh and the ability for the shutter glasses to open and close and the ability for a human to properly perceive the images. In the example depicted in FIG. 2, image A is shown first as 22. In a two dimensional example, both shutters of headset 12 are open when the display is refreshed with image 22 and both shutters of headset 14 are closed. It is desirable to have a set of black or blank images 24 disposed between consecutive viewed images to inhibit "crosstalk" of the images bleeding into one another, but this is not to be considered limiting and may be omitted in certain implementations in order to provide more video "channels" to accommodate more than two users. In a stereoscopic 3D example, image 22 might be only a left eye image in which case only the left eye shutter of headset 12 is open while the right eye is closed. The viewer using headset 14 is shielded from viewing image 22 because both left and right eye shutters are closed whether the display is presenting 2D or 3D images.

Image B is depicted first as 26. In a two dimensional example, both shutters of headset 14 are open when the display is refreshed with image 26 and both shutters of headset 12 are closed. It is again desirable to have a set of black or blank images 24 disposed between consecutive viewed images to inhibit "crosstalk" of the images bleeding into one another, but this is not to be considered limiting and may be omitted in certain implementations. In a stereoscopic 3D example, image 26 might be only a left eye image in which case only the left eye shutter of headset 14 is open while the right eye is closed. The viewer using headset 12 is shielded from viewing image 26 because both left and right eye shutters are closed whether the display is presenting 2D or 3D images.

Image A is next shown as 28. In a two dimensional example, both shutters of headset 12 are again open when the display is refreshed with image 26 and both shutters of headset 14 are closed. In a stereoscopic 3D example, image 26 might be only a right eye image in which case only the right eye shutter of headset 12 is open while the left eye is closed.

Image B is depicted next as 30. In the two dimensional example, both shutters of headset 14 are again open when the display is refreshed with image 30 and both shutters of headset 12 are closed. In a stereoscopic 3D example, image 30 might be only a right eye image in which case only the right eye shutter of headset 14 is open while the left eye is closed.

In this manner, the display alternately displays images A and B in a manner that is viewed by synchronized shutter glasses forming a part of a headset so that only the viewer using headset A is able to view image A and the viewer using headset B is able to view image B, where images A and B can be either 2D or 3D. Headsets 12 and 14 also have an integral audio system so that the audio associated with images A and B are sent in different audio channels in a multiplex of any sort (AM, FM, Bluetooth or IR with separate destination addresses, or any packetized digital audio with separate headers, etc.).

Upon consideration of the present teachings, it will be evident to those skilled in the art that when multiple images are to be displayed for consumption by multiple viewers, the amount of time that the image is present for each viewer is reduced compared with that of conventional television display imaging. Hence, in order to compensate for this difference, the brightness of each image may have to be increased so that each viewer does not perceive a substantial decrease in overall brightness.

Figure 3:
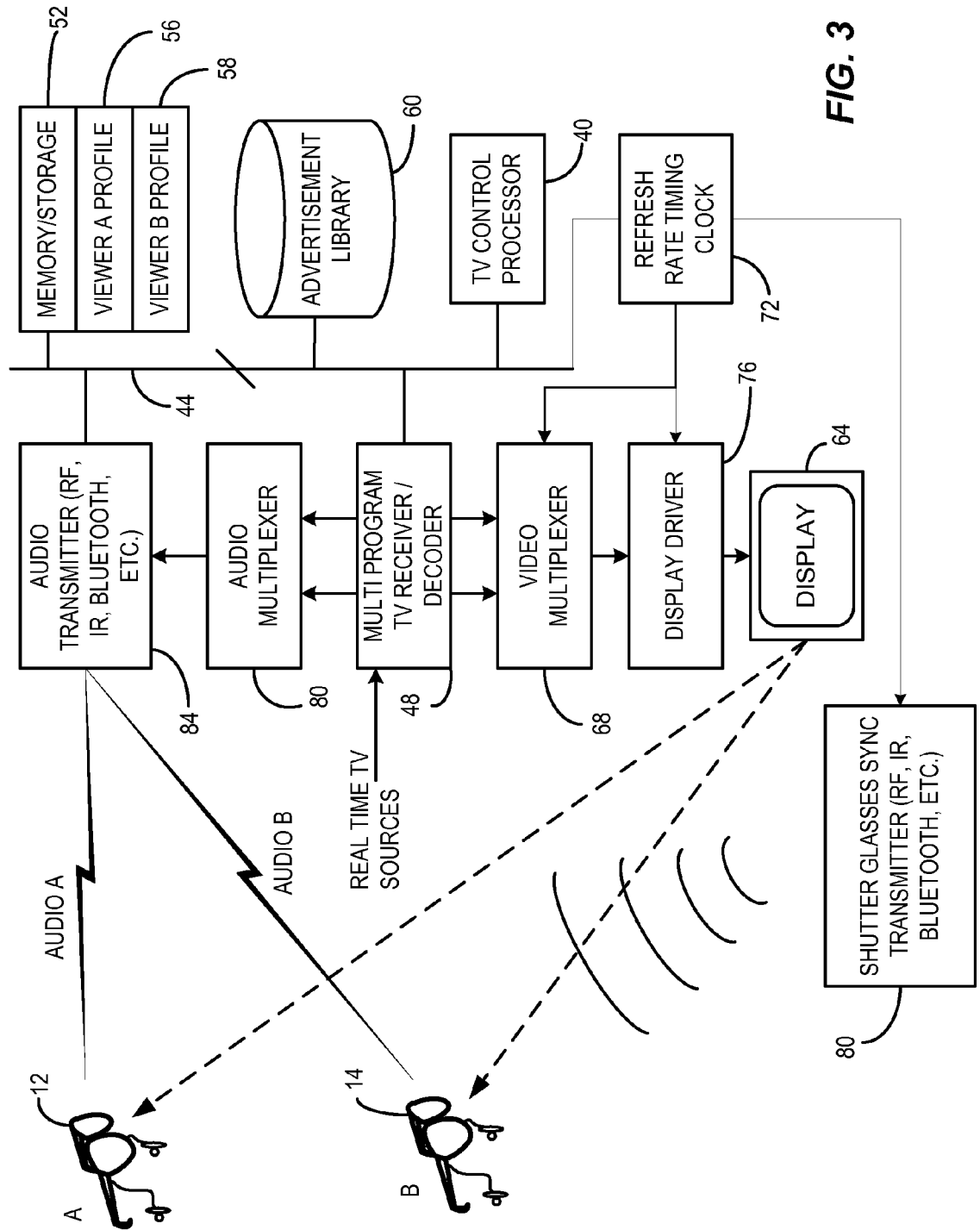
FIG. 3 is an example of a block diagram of a television system implementation consistent with certain embodiments of the present invention.

An example of a television system as described above is presented in greater detail at FIG. 3. In this example, the television operates under control of a television control processor 40 which controls operation of the major components of the television via one or more communication buses 44. TV signals can be received via any suitable source including broadcast, cable, satellite, Internet, or local source such as BluRay™ disc player, DVD player, camcorder, etc. This is depicted generally as 48 in order to simplify the present drawing with the understanding that 48 can represent multiple tuners, receivers, decoders and real time audio/video (A/V) source interfaces such as RF and IP sources without limitation. The program content of the TV signals can be represented as either two dimensional or three dimensional program content.

Processor 40 includes associated memory 52 which contains programming instructions for carrying out operation of the television and additionally contains profiles for the various registered viewers of the television and other data. In this case, only two profiles are shown in memory 52—profile 56 is shown for viewer A and profile 58 is shown for viewer B, but many such profiles can be provided. Such profiles can contain numerous types of information including a viewer's interests, parental controls, viewing history, profiles derived from viewing habits, profiles produced by third parties such as content providers, advertisers, etc. This information from the viewer profile can be used to provide targeted advertising, for example from an advertisement library 60, to the individual viewers. These advertisements can be viewed and heard simultaneously by each viewer without the other being exposed to it. For example, a minor child might be barred from access to content more suitable for adults such as alcoholic beverage advertisements. Instead, the child might be entertained with a short feature or provided with a toy advertisement. A person casually viewing the display 64 will perceive a blend of the two (or more) images which will be confusing and likely incomprehensible much of the time.

In the present two user example, each viewer is presented with a separate advertisement (A and B) e.g. from advertisement library 60 and/or a source of real-time advertising content (or near real time). The multi-program TV receiver/decoder 48 receives these two images and provides the two images to video multiplexer 68. Then, in synchronization with the refresh rate timing clock 72, multiplexer 68 presents the display driver 76 with images for alternating frames for each of the viewers A and B on the display 64. The shutter glasses of headsets 12 and 14 are synchronized so as to only display image A or image B is viewable through headsets 12 or 14 respectively based upon the signal transmitted from the shutter glasses synchronization transmitter 80 using IR, RF, or any other suitable transmitter technology. In this manner, the images for headsets 12 and 14 are isolated from each other.

It is noted that in addition to receiving two or more different advertisements as described above, the actual program content received by the viewers can be different with the program content being presented to each viewer in any combination of two dimensional or three dimensional stereoscopic presentations on the display with the shutter glasses synchronized accordingly.

The headsets 12 and 14 being each associated with a profile 56 and 58 respectively permits the processor 40 to select both video and audio for presentation to the respective viewers using the headset 12 and 14. In order to provide the audio, the audio portion of each of the programs is provided by 48 to an audio multiplexer 80. The two (or more) audio programs are placed in separate channels in an audio multiplex by multiplexer 80 which can be transmitted by transmitter 84 using any suitable technology such as RF, IR or BlueTooth for receipt by the headsets 12 and 14. Each of the headsets is provisioned by any suitable mechanism to receive only the channel directed to that specific headset. For example, in one simple implementation, an address of the headset can be entered into a setup screen of the display and that address can be used to address the headset. In another simple implementation, a mechanical switch can be used to select (e.g., by cycling through multiple channels) a receiving channel for audio or the headsets can be programmed by any suitable mechanism to receive only one channel. In another simple implementation, headsets can be factory programmed to one of several available channels that are then associated with the headset in a setup process with the television.

The TV control processor 40 utilizes the viewer profiles 56 and 58 to determine based on viewing habits, targeted advertising, parental controls and the like which advertisements should be presented to the individual viewer. Any of numerous techniques can be used to select suitable advertisements for each of the viewers with profiles stored in the viewer profiles without limitation.

Figure 4:
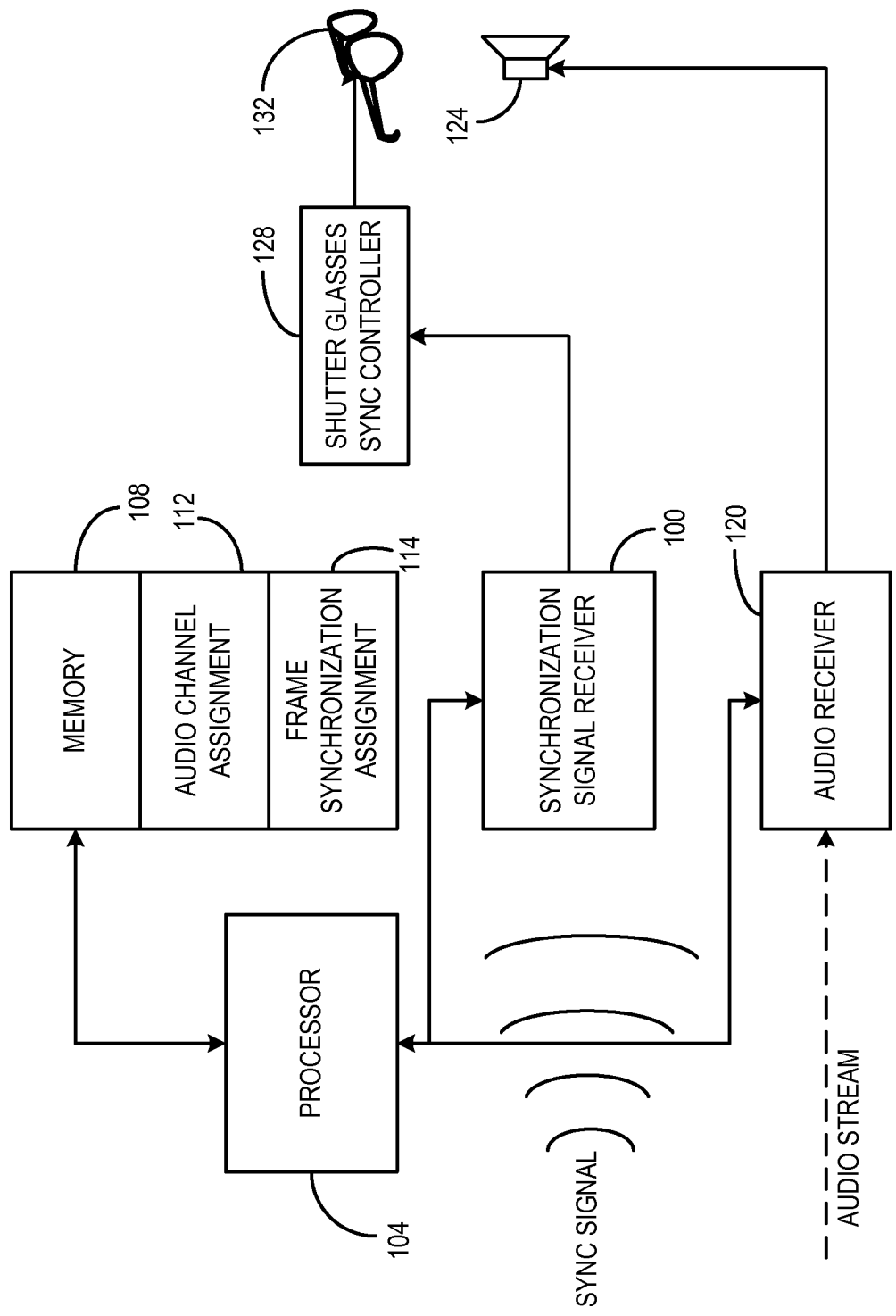
FIG. 4 is an example of a block diagram of a headset consistent with certain embodiments of the present invention.

The headsets utilized in the process described above is further illustrated in FIG. 4, where a synchronization signal is received by a synchronization signal receiver 100 under control of processor 104. Processor 104 accesses memory 108 which stores audio channel assignments at 112 and frame synchronization assignments 114 in order to control the audio receiver 120's audio channel assignment and video synchronization assignment associated with the video synchronization signal received at 100. This permits the audio receiver 120 to receive the appropriate audio signal for the headset's assignment for driving audio transducers 124. The synchronization signal receiver 100 provides synchronization signals to shutter glasses sync controller 128 in order to open and close the shutters of glasses 132. The synchronization signal can take many forms and is currently most commonly an infrared (IR) signal. In order to implement the present implementation, the sync signal should have designators which identify each frame being refreshed so that the proper frames can cause the shutter glasses sync control to open the appropriate lens or lenses of shutter glasses 132. Any suitable coding can be used to accomplish such a purpose and can be very simply implemented upon consideration of the present teachings by one skilled in the art.

Figure 5:
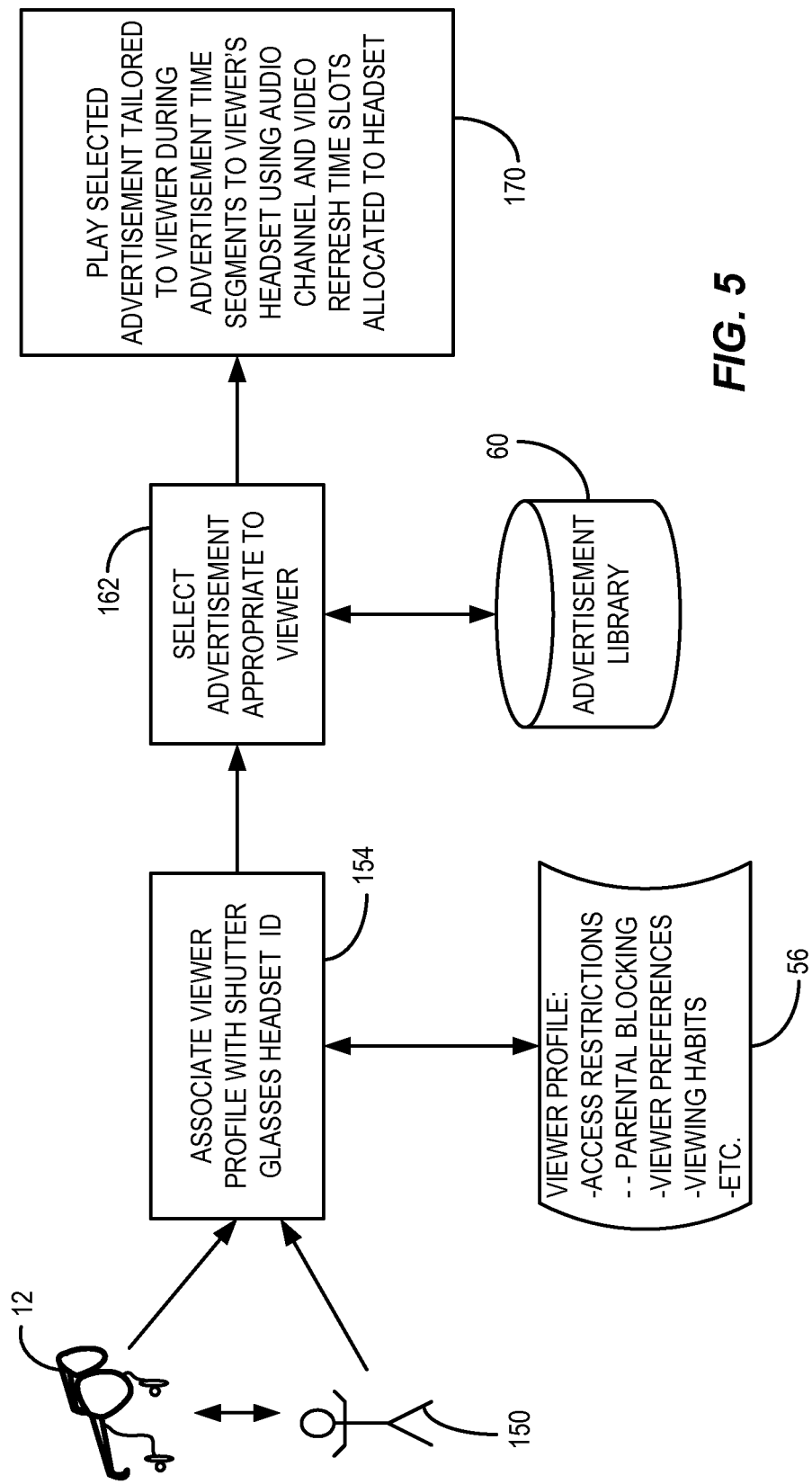
FIG. 5 is a diagram depicting an example of an implementation of an overall process consistent with certain embodiments of the present invention.

An example process used to implement receipt of a targeted advertisement in the manner described above is depicted somewhat graphically in FIG. 5. In this example, it is assumed that a viewer 150 is using headset 12. At 154, the viewer's profile 56 is associated with the headset 12's identification. The processor selects an advertisement based at least in part on the viewer profile 158 at 162 from the advertisement library 60. The selected advertisement is then played at 170 to viewer 150 using the shutters of headset 12 to reveal the video in sync with the sync signal and the audio channel to provide audio to headset 12.

Figure 6:
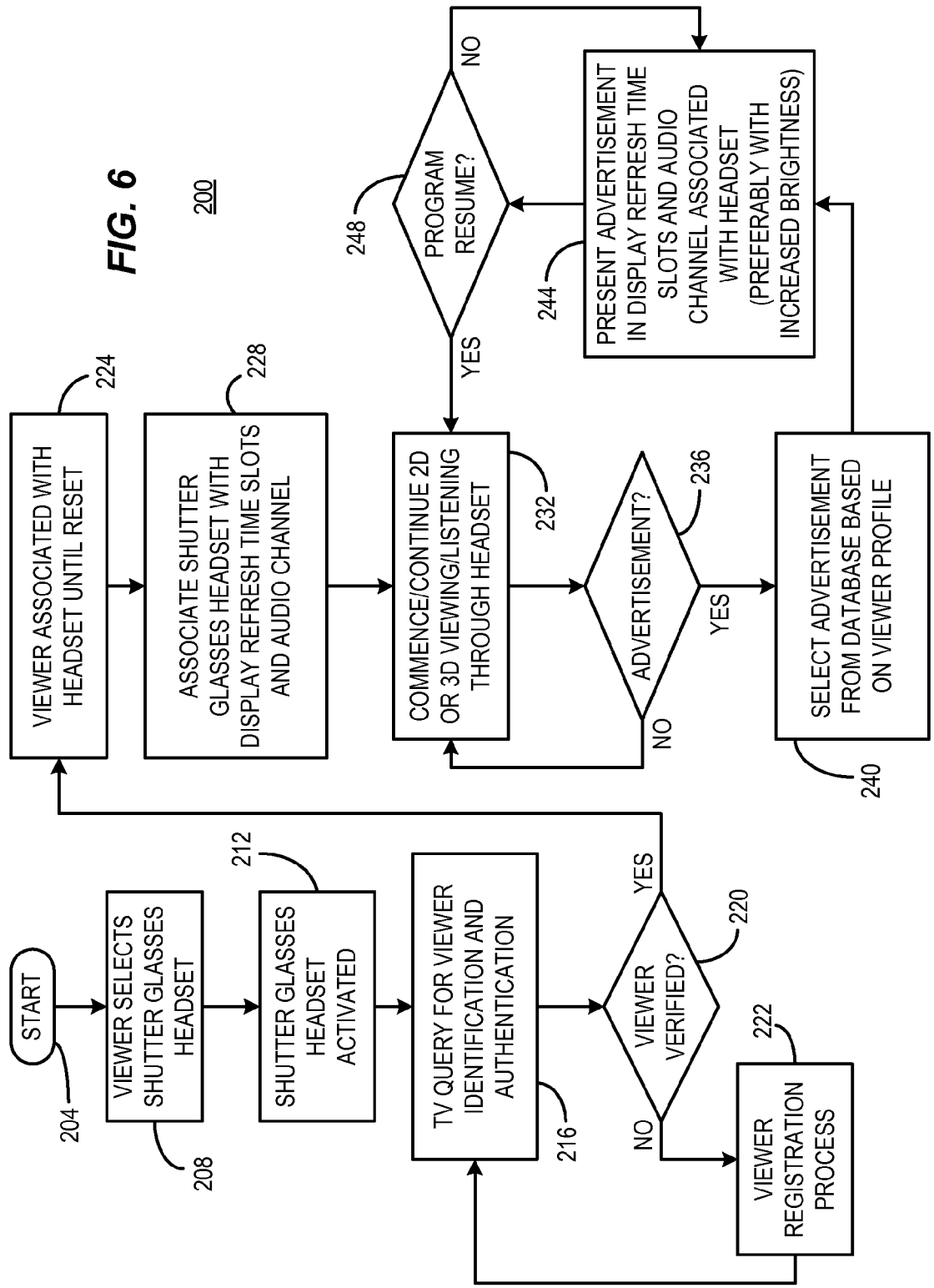
FIG. 6 is a flow chart of an example process implementing an embodiment consistent with certain embodiments of the present invention.

Referring now to FIG. 6, an example process implementation 200 of operation of a television consistent with the present invention starts at 204 after which a viewer selects a shutter glasses headset for use at 208. The shutter glasses headset is activated at 212. In one implementation, the activation of the headset can initiate a process at the TV or in another implementation, the user initiates the process at the TV, while in other implementations, each headset is dedicated to a particular viewer and the process of 216 is initiated in a setup routine. In any event, at 216 the TV enters a state where a query is provided to the viewer to provide an ID code or go through an authentication process in order to verify that the viewer is properly associated with a viewer profile. If the viewer is not verified at 220, the viewer is taken to a viewer registration process at 222.

If the viewer is verified at 220, the viewer is associated with a headset at least until some type of reset process is carried out at 224. The shutter glasses headset is then associated with a set of display refresh time slots and with an audio channel so that audio and video can be properly received at the headset at 228. The process then commences (or continues) with presentation of 2D or 3D content in the manner previously disclosed through the headset at 232. As previously noted, the program content being viewed can be the same or different for two or more viewers without limitation.

When an advertisement time slot is encountered at 236, an advertisement is selected from the advertisement database based on the restrictions and other characteristics including targeting advertisement information stored in the user profile at 240. The selected advertisement is then presented in the display refresh rate time slot associated with the viewer's headset and with the audio being presented in the audio channel of that headset at 244 (preferably with increased brightness) until the program resumes at 248 at which point control returns to 232. Any suitable known technology can be used to identify the start and end of a commercial advertisement time slot.

Figure 7:
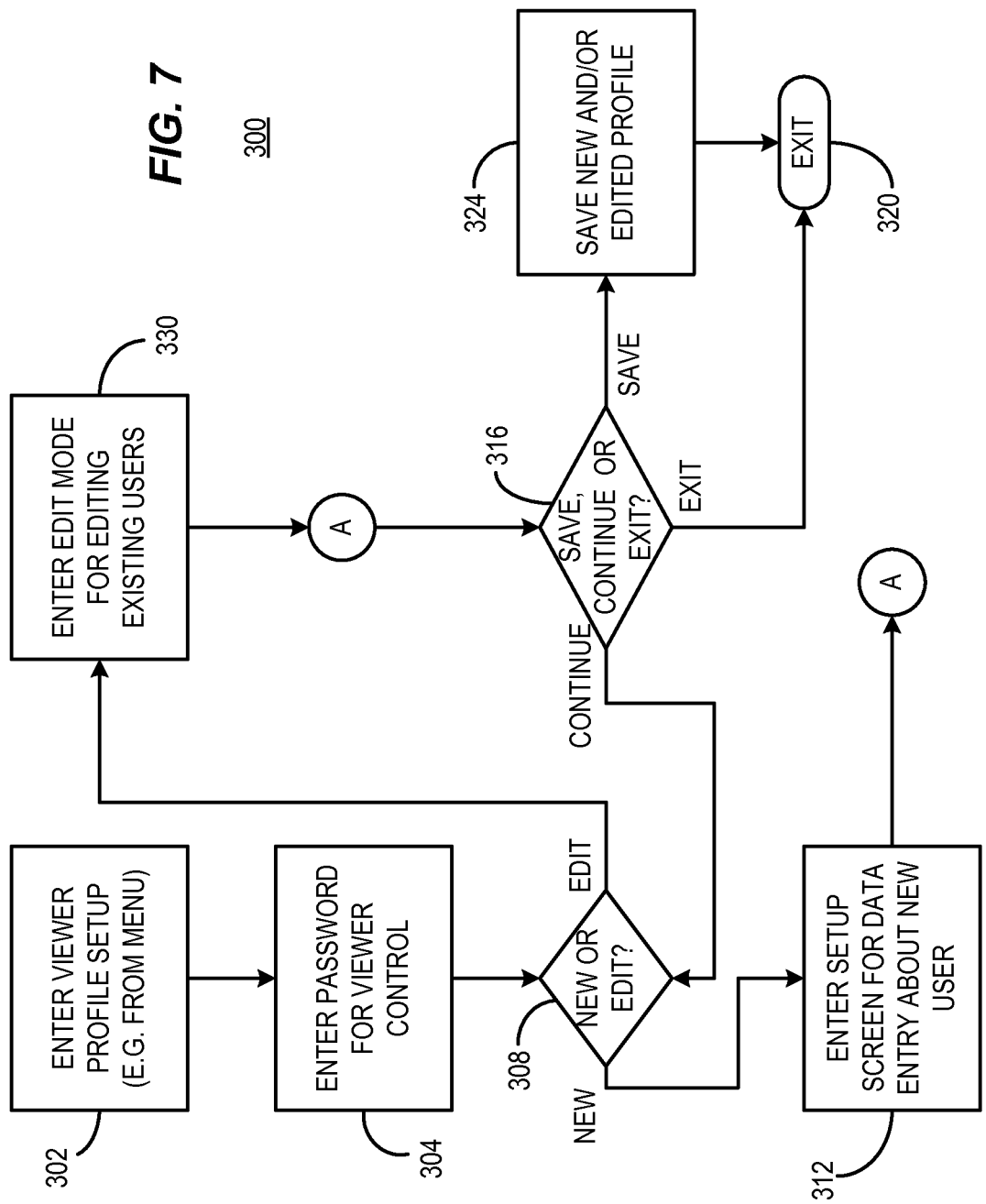
FIG. 7 is a flow chart of an example viewer profile registration and editing process consistent with certain embodiments of the present invention.

Referring to FIG. 7, process 300 depicts an example process for a viewer to enter or edit a viewer profile starting at 302 where the profile setup action is entered from a menu or remote controller selection. Since editing or setting up a viewer profile can involve parental controls, the user is preferably required to enter a password or use any other suitable mechanism such as biometrics for identification of an authorized user that is permitted to establish or edit profiles at 304. At 308, the viewer selects whether to enter a new profile or edit an existing one. If a new profile is to be created, the process advances to 312 where a setup screen is entered to permit data entry pertaining to a new user including preferences and restrictions. Control then passes to 316 where the user is given the option to save, continue to edit or add viewer profiles or exit. If the user elects to continue, control passes back to 308. If the user elects to exit without saving, control passes to 320 to exit the routine, probably after a confirmation action to assure that data is not inadvertently lost.

If the user elects to save the changes or new profiles control passes to 324 where the changes are saved prior to exiting at 320. If the user elects to edit an existing profile at 308, control passes to 330 where an editing mode is entered and all user entered data is presented in an orderly manner for editing by the user and control is then passed to 316 to save or exit.

Figure 8:
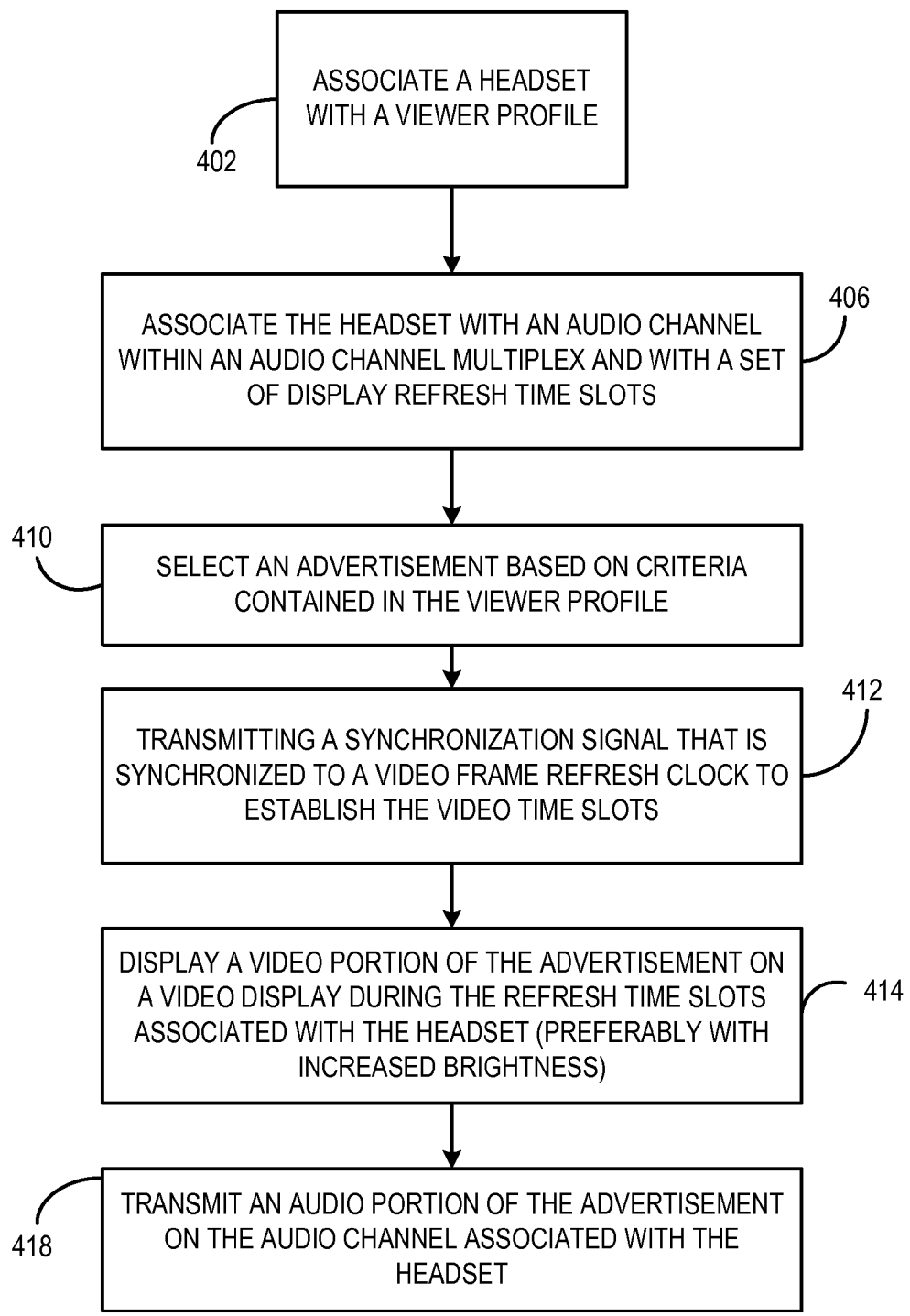
FIG. 8 is a flow chart of an example process consistent with certain embodiments of the present invention.

The an example of the overall process carried out at the TV is depicted at the flow chart 400 of FIG. 8 where the method of operating a television starts by associating a headset with a viewer profile at 402. At 406, the headset is associated with an audio channel within an audio channel multiplex and with a set of display refresh time slots. At 410, an advertisement is selected based on criteria contained in the viewer profile. At 412, the television transmits a synchronization signal that is synchronized to a video frame refresh clock to establish the video time slots. The video portion of the advertisement is displayed on a video display during the refresh time slots associated with the headset at 414. This display can be carried out with increased brightness so the user does not perceive a change or low level in the brightness level of the display. The audio portion of the advertisement is transmitted on the audio channel associated with the headset at 418. This basic process is carried out for each headset and viewer according to their profile using a separate channel (e.g., first and second channels) for audio and a separate set of video sync timing slots for each headset's video shutters. Many variations will occur to those skilled in the art upon consideration of the present teachings.

Thus, in certain implementations, a method of operating a television involves associating a first headset with a first viewer profile; associating a second headset with a second viewer profile; associating the first headset with a first audio channel within an audio channel multiplex and with a first set of display refresh time slots; associating the second headset with a second audio channel within the audio channel multiplex and with a second set of display refresh time slots; selecting a first advertisement based on criteria contained in the first viewer profile; selecting a second advertisement based on criteria contained in the second viewer profile; displaying a video portion of the first advertisement on a video display during the first set of refresh time slots associated with the first headset; displaying a video portion of the second advertisement on the video display during the second set of refresh time slots associated with the second headset; transmitting a synchronization signal that is synchronized to a video frame refresh clock to establish the video time slots; transmitting an audio portion of the first advertisement on the first audio channel associated with the headset; transmitting an audio portion of the second advertisement on the second audio channel associated with the headset; at a first headset: receiving audio via the first audio channel at an audio receiver, reproducing the first audio channel as audio through a first transducer, and opening and closing left and right eye views through the shutter glasses to reveal the video portion of the first advertisement on the display; at a second headset: receiving audio via the second audio channel at an audio receiver, reproducing the second audio channel as audio through a second transducer, and opening and closing left and right eye views through the shutter glasses to reveal the video portion of the second advertisement on the display; and where the video portion of the first and second advertisements comprise stereoscopic video portions, and where displaying the video portions of the first and second advertisement is carried out during breaks in displaying three dimensional stereoscopic programming content.

In certain implementations, a method consistent with certain embodiments involves associating a first headset with a first viewer profile; associating the first headset with a first audio channel within an audio channel multiplex and with a first set of display refresh time slots; selecting a first advertisement based on criteria contained in the first viewer profile; displaying a video portion of the first advertisement on a video display during the first set of refresh time slots associated with the first headset; transmitting a synchronization signal that is synchronized to a video frame refresh clock to establish the video time slots; and transmitting an audio portion of the first advertisement on the first audio channel associated with the headset.

In certain implementations, the method further involves associating a second headset with a second viewer profile; associating the second headset with a second audio channel within the audio channel multiplex and with a second set of display refresh time slots; selecting a second advertisement based on criteria contained in the second viewer profile; displaying a video portion of the second advertisement on the video display during the second set of refresh time slots associated with the second headset; and transmitting an audio portion of the second advertisement on the second audio channel associated with the headset.

In certain implementations, the method further involves at the first headset: receiving audio via the first audio channel at an audio receiver; reproducing the first audio channel as audio through a first transducer; and opening and closing left and right eye views through the shutter glasses to reveal the video portion of the first advertisement on the display.

In certain implementations, the method further involves at the second headset: receiving audio via the second audio channel at an audio receiver; reproducing the second audio channel as audio through a second transducer; and opening and closing left and right eye views through the shutter glasses to reveal the video portion of the second advertisement on the display.

In certain implementations, the method further involves at the first headset: receiving audio via the first audio channel at an audio receiver, reproducing the first audio channel as audio through a first transducer, and opening and closing left and right eye views through the shutter glasses to reveal the video portion of the first advertisement on the display; and at the second headset: receiving audio via the second audio channel at an audio receiver, reproducing the second audio channel as audio through a second transducer, and opening and closing left and right eye views through the shutter glasses to reveal the video portion of the second advertisement on the display.

In certain implementations, the method further involves displaying multiple images on the display with a blank image between each of the multiple images. In certain implementations, the video portion of the first advertisement comprises a stereoscopic video portion. In certain implementations, the video portion of the first advertisement comprises a two dimensional video portion. In certain implementations, the video portion of the second advertisement comprises a stereoscopic video portion. In certain implementations, the video portion of the second advertisement comprises a two dimensional video portion. In certain implementations, displaying the video portion of the first advertisement is carried out during breaks in displaying three dimensional stereoscopic programming content. In certain implementations, displaying the video portions of the first and second advertisements are carried out during breaks in displaying three dimensional stereoscopic programming content. In certain implementations, displaying the video portions of the first and second advertisements are carried out with greater brightness than if both headsets are receiving the same video image. In certain implementations, at least one of the first and second advertisements is received in real time. In certain implementations, at least one of the first and second advertisements is retrieved from a local advertisement library.

A method of operating a stereoscopic shutter glasses headset involves associating the headset with an audio channel within an audio channel multiplex and with a set of display refresh time slots; receiving audio via an audio channel receiver, where the audio is selected as audio for an advertisement selected on the basis of a viewer profile; receiving a video frame synchronization signal; and opening and closing left and right eye views through the shutter glasses in synchronization to the video frame synchronization signal to reveal an image on a display, where the image is selected as video for the advertisement selected on the basis of the viewer profile.

In certain implementations, the method further involves reproducing the audio channel as audio through a transducer forming a part of the shutter glasses headset. In certain implementations, the revealed image on the display comprises a stereoscopic video portion. In certain implementations, the revealed image on the display comprises a two dimensional video portion. In certain implementations, the revealed image on the display of the advertisement occurs during breaks in displaying three dimensional stereoscopic programming content. In certain implementations, displaying the video portions of the first and second advertisements are carried out with greater brightness than if both headsets are receiving the same video image.

In certain implementations, at least one of the first and second advertisements is received in real time. In certain implementations, at least one of the first and second advertisements is retrieved from a local advertisement library.

A television consistent with certain implementations has a storage device that stores a viewer profile. A processor is programmed to associate a headset with a viewer profile and store the association. The processor is further programmed to associate the headset with an audio channel within an audio channel multiplex and with a set of display refresh time slots. The processor is further programmed to select an advertisement based on criteria contained in the viewer profile. A display displays a video portion of the advertisement on a video display during the display refresh time slots associated with the headset. An audio transmitter transmits an audio portion of the advertisement on the audio channel associated with the headset.

In certain implementations, a headset has an audio receiver that receives audio via the audio channel and reproduces the audio channel as audio through a transducer, and shutter glasses open and close left and right eye views to reveal the video portion of the advertisement on the display.

In certain implementations, the video portion of the advertisement is a stereoscopic video portion. In certain implementations, displaying the video portion of the advertisement is carried out during breaks in displaying three dimensional stereoscopic programming content. In certain implementations, displaying the video portions of the first and second advertisements are carried out with greater brightness than if both headsets are receiving the same video image. In certain implementations, at least one of the first and second advertisements is received in real time. In certain implementations, at least one of the first and second advertisements is retrieved from a local advertisement library.

Another television consistent with certain implementations has a storage device that stores a plurality of viewer profiles. A processor is programmed to associate each of a plurality of headsets with one of the viewer profiles and store the associations. The processor is further programmed to associate each headset with an audio channel within an audio channel multiplex and with a set of display refresh time slots. The processor is further programmed to select a plurality of advertisements based on criteria contained in the viewer profile. A display displays a plurality of video portions of the selected plurality of advertisements on a video display during the respective display refresh time slots associated with each headset. An audio transmitter transmits a plurality of audio portions of the selected plurality of advertisements on the audio channel associated with each headset.

In certain implementations, the television has a plurality of headsets, where each headset has an audio receiver that receives audio via the associated audio channel and reproduces the audio channel as audio through a transducer; and shutter glasses that open and close left and right eye views to reveal the video portion of the associated advertisement on the display. In certain implementations, the video portion of the advertisement comprises a stereoscopic video portion. In certain implementations, displaying the video portion of the advertisement is carried out during breaks in displaying three dimensional stereoscopic programming content. In certain implementations, displaying the video portions of the first and second advertisements is carried out with greater brightness than if both headsets are receiving the same video image. In certain implementations, at least one of the first and second advertisements is received in real time. In certain implementations, at least one of the first and second advertisements is retrieved from a local advertisement library.

Those skilled in the art will recognize, upon consideration of the above teachings, that certain of the above exemplary embodiments may be based upon use of one or more programmed processors. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using one or more programmed processors executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of operating a television, comprising:
associating a first headset with a first viewer profile residing on the television by authenticating or verifying a first user of the first headset to establish association of the first user with the first viewer profile;
associating a second headset with a second viewer profile residing on the television by authenticating or verifying a second user of the second headset to establish association of the second user with the second viewer profile;
associating the first headset with a first audio channel within an audio channel multiplex and with a first set of display refresh time slots;
associating the second headset with a second audio channel within the audio channel multiplex and with a second set of display refresh time slots;
transmitting a synchronization signal that is synchronized to a video frame refresh clock to establish the video time slots;
displaying a video portion of three dimensional stereoscopic programming content on a video display during both the first and second set of video display refresh time slots;
transmitting an audio portion of the three dimensional stereoscopic programming content on both the first and second audio channels associated with the first and second headsets;
determining that an advertisement start time slot is encountered;
selecting a first advertisement based on criteria contained in the first viewer profile;
selecting a second advertisement based on criteria contained in the second viewer profile;
displaying a video portion of the first advertisement on a video display during the first set of refresh time slots associated with the first headset;
displaying a video portion of the second advertisement on the video display during the second set of refresh time slots associated with the second headset;
transmitting an audio portion of the first advertisement on the first audio channel associated with the first headset;
transmitting an audio portion of the second advertisement on the second audio channel associated with the second headset;
at a first headset: receiving audio via the first audio channel at an audio receiver, reproducing the first audio channel as audio through a first transducer, and opening and closing left and right eye views through the shutter glasses to reveal the video portion of the first advertisement on the display;
at a second headset: receiving audio via the second audio channel at an audio receiver, reproducing the second audio channel as audio through a second transducer, and opening and closing left and right eye views through the shutter glasses to reveal the video portion of the second advertisement on the display; and
where the video portion of the first and second advertisements comprise stereoscopic video portions, and where displaying the video portions of the first and second advertisement is carried out during breaks in displaying three dimensional stereoscopic programming content.

2. A method of operating a television, comprising:
associating a first headset with a first viewer profile residing on the television by authenticating or verifying a first user of the first headset to establish association of the first user with the first viewer profile;
associating the first headset with a first audio channel within an audio channel multiplex and with a first set of display refresh time slots;
associating a second headset with a second viewer profile residing on the television by authenticating or verifying a second user of the second headset to establish association of the second user with the second viewer profile;
associating the second headset with a second audio channel within the audio channel multiplex and with a second set of display refresh time slots;
transmitting a synchronization signal that is synchronized to a video frame refresh clock to establish the video time slots;
displaying a video portion of main programming content on a video display during both the first and second set of refresh time slots associated with the first and second headsets;
transmitting an audio portion of the main programming content on the first audio channel associated with the headset;
determining that an advertisement is beginning;
selecting a first advertisement based on criteria contained in the first viewer profile;
displaying a video portion of the first advertisement on a video display during the first set of refresh time slots associated with the first headset;
transmitting an audio portion of the first advertisement on the first audio channel associated with the headset;
selecting a second advertisement based on criteria contained in the second viewer profile;
displaying a video portion of the second advertisement on the video display during the second set of refresh time slots associated with the second headset; and
transmitting an audio portion of the second advertisement on the second audio channel associated with the headset.

3. The method according to claim 2, further comprising:
at the first headset:
receiving audio via the first audio channel at an audio receiver;
reproducing the first audio channel as audio through a first transducer; and
opening and closing left and right eye views through the shutter glasses to reveal the video portion of the first advertisement on the display.

4. The method according to claim 2, further comprising:
at the second headset:
receiving audio via the second audio channel at an audio receiver;
reproducing the second audio channel as audio through a second transducer; and
opening and closing left and right eye views through the shutter glasses to reveal the video portion of the second advertisement on the display.

5. The method according to claim 2, further comprising:
at the first headset:
receiving audio via the first audio channel at an audio receiver,
reproducing the first audio channel as audio through a first transducer, and
opening and closing left and right eye views through the shutter glasses to reveal the video portion of the first advertisement on the display; and
at the second headset:
receiving audio via the second audio channel at an audio receiver,
reproducing the second audio channel as audio through a second transducer, and
opening and closing left and right eye views through the shutter glasses to reveal the video portion of the second advertisement on the display.

6. The method according to claim 2, further comprising displaying multiple progressively refreshed frames of images on the display with a blank image between certain of the multiple progressively refreshed frames of images.

7. The method according to claim 2, where the video portion of the first advertisement comprises a stereoscopic video portion.

8. The method according to claim 2, where the video portion of the first advertisement comprises a two dimensional video portion.

9. The method according to claim 2, where the video portion of the second advertisement comprises a stereoscopic video portion.

10. The method according to claim 2, where the video portion of the second advertisement comprises a two dimensional video portion.

11. The method according to claim 2, where displaying the video portion of the first advertisement is carried out during breaks in displaying three dimensional stereoscopic main programming content.

12. The method according to claim 2, where displaying the video portions of the first and second advertisements are carried out during breaks in displaying three dimensional stereoscopic main programming content.

13. The method according to claim 2, where displaying the video portions of the first and second advertisements are carried out with greater brightness than if both headsets are receiving the same video image.

14. The method according to claim 2, where at least one of the first and second advertisements is received in real time.

15. The method according to claim 2, where at least one of the first and second advertisements is retrieved from a local advertisement library.

16. A tangible non-transitory computer readable electronic storage medium storing instructions which, when executed on one or more programmed processors, carry out a method according to claim 2.

17. A method of operating a stereoscopic shutter glasses headset, comprising:
associating the headset with an audio channel within an audio channel multiplex associated with a set of display refresh time slots;
associating the headset with a viewer profile by authenticating or verifying a user of the headset to establish association of the user with the viewer profile;
receiving audio via an audio channel receiver for main audio programming content, where the main audio content is transmitted to multiple audio channels associated with multiple refresh time slots;
receiving audio via the audio channel receiver, where the audio is selected as audio for an advertisement selected on the basis of the viewer profile;
receiving a video frame synchronization signal; and
opening and closing left and right eye views through the shutter glasses in synchronization to the video frame synchronization signal to reveal an image on a display, where the image is selected as main video programming content that is transmitted to multiple video channels except during an advertisement, where during the advertisement video for the advertisement selected on the basis of the viewer profile.

18. The method according to claim 17, further comprising reproducing the audio channel as audio through a transducer forming a part of the shutter glasses headset.

19. The method according to claim 17, where the revealed image on the display comprises a stereoscopic video portion.

20. The method according to claim 17, where the revealed image on the display comprises a two dimensional video portion.

21. The method according to claim 17, where revealed image on the display of the advertisement occurs during breaks in displaying three dimensional stereoscopic main programming content.

22. The method according to claim 17, where displaying the video portions of the advertisement is carried out with greater brightness than if multiple headsets are receiving the same video image.

23. The method according to claim 17, where the advertisement is received in real time.

24. The method according to claim 17, where the advertisement is retrieved from a local advertisement library.

25. A tangible non-transitory computer readable electronic storage medium storing instructions which, when executed on one or more programmed processors, carry out a method according to claim 17.

26. A television, comprising:
a storage device that stores a plurality of viewer profiles;
a processor programmed to associate a plurality of headsets with a plurality of viewer profiles and store the associations, where in being programmed to associate the plurality of headsets with the plurality of viewer profiles the processor is programmed to verify or authenticate a user of each of the plurality of headsets to one of the viewer profiles;
the processor being further programmed to associate each of the plurality of headsets with an audio channel within an audio channel multiplex and with a set of display refresh time slots;
the processor being further programmed to select an advertisement based on criteria contained in the viewer profile;
a display that displays a video portion of the advertisement on a video display during the display refresh time slots associated with the headset when an advertisement is being displayed and to display the programming content on a plurality of the display refresh time slots when an advertisement is not being displayed; and an audio transmitter that transmits an audio portion of the advertisement on the audio channel associated with each headset during display of an advertisement and transmit audio content associated with the programming content on a plurality of audio channels during display of the programming content.

27. The television according to claim 26, further comprising a headset, where the headset comprises an audio receiver that receives audio via the audio channel and reproduces the audio channel as audio through a transducer; and shutter glasses that open and close left and right eye views to reveal the video portion of the advertisement on the display.

28. The television according to claim 26, where the video portion of the advertisement comprises a stereoscopic video portion.

29. The television according to claim 26, where displaying the video portion of the advertisement is carried out during breaks in displaying three dimensional stereoscopic programming content.

30. The television according to claim 26, where displaying the video portions of the advertisement is carried out with greater brightness than when multiple headsets are receiving the same video image.

31. The television according to claim 26, where the advertisement is received in real time.

32. The television according to claim 26, where the advertisement is retrieved from a local advertisement library.

33. A television, comprising:

a storage device that stores a plurality of viewer profiles;

a processor programmed to associate each of a plurality of headsets with one of the viewer profiles and store the associations, where in being programmed to associate the plurality of headsets with the plurality of viewer profiles the processor is programmed to verify or authenticate a user of each of the plurality of headsets to one of the viewer profiles;

the processor being further programmed to associate each headset with an audio channel within an audio channel multiplex and with a set of display refresh time slots;

the processor being further programmed to select a plurality of advertisements based on criteria contained in the viewer profile;

a display that displays a plurality of video portions of the selected plurality of advertisements on a video display during the respective display refresh time slots associated with each headset, where the display further displays programming content during multiple display refresh time slots when the advertisements are not being displayed; and an audio transmitter that transmits a plurality of audio portions of the selected plurality of advertisements on the audio channel associated with each headset, and where the audio transmitter further transmits an audio portion associated with the programming content over multiple audio channels when the advertisements are not being displayed.

34. The television according to claim 33, further comprising a plurality of headsets, where each headset comprises an audio receiver that receives audio via the associated audio channel and reproduces the audio channel as audio through a transducer; and shutter glasses that open and close left and right eye views to reveal the video portion of the associated advertisement on the display.

35. The television according to claim 33, where the video portion of the advertisement comprises a stereoscopic video portion.

36. The television according to claim 33, where displaying the video portion of the advertisement is carried out during breaks in displaying three dimensional stereoscopic programming content.

37. The television according to claim 33, where displaying the video portions of the advertisements are carried out with greater brightness than if both headsets are receiving the same video image.

38. The method according to claim 33, where at least one of the advertisements is received in real time.

39. The method according to claim 33, where at least one of the advertisements is retrieved from a local advertisement library.

* * * * *